United States Patent [19]

Duta et al.

[11] Patent Number: 4,878,393
[45] Date of Patent: Nov. 7, 1989

[54] DEXTROUS SPHERICAL ROBOT WRIST

[76] Inventors: Oprea Duta, 510 W. Belmont, #2109, Chicago, Ill. 60657; Michael M. Stanisic, 779 Colfax, Elmhurst, Ill. 60126

[21] Appl. No.: 199,902

[22] Filed: May 27, 1988

[51] Int. Cl.[4] .............................................. B25J 17/02
[52] U.S. Cl. ..................................... 74/479; 248/184; 464/106; 464/136; 901/29
[58] Field of Search ................. 74/479; 464/106, 112, 464/125, 136, 179; 901/28, 29; 248/184

[56] References Cited

U.S. PATENT DOCUMENTS

| | | | |
|---|---|---|---|
| 1,058,878 | 4/1913 | Lowndes | 464/125 |
| 1,166,064 | 12/1915 | Linnan | 464/125 |
| 1,181,902 | 5/1916 | Lessert et al. | 464/106 |
| 3,965,700 | 6/1976 | Nicoletti | 464/125 |
| 3,973,469 | 8/1976 | Humen | 91/51 |
| 4,045,958 | 9/1977 | Wells | 60/325 |
| 4,068,536 | 1/1978 | Stackhouse | 74/417 |
| 4,068,763 | 1/1978 | Fletcher | 74/515 E X |
| 4,073,201 | 2/1978 | Taylor et al. | 901/29 X |
| 4,194,437 | 3/1980 | Rosheim | 92/120 |
| 4,296,681 | 10/1981 | Rosheim | 92/122 |
| 4,574,655 | 3/1986 | Kimura | 74/665 A |
| 4,628,765 | 12/1986 | Dien et al. | 901/29 X |
| 4,683,406 | 7/1987 | Ikeda | 318/568 |
| 4,686,866 | 8/1987 | Rosheim | 901/29 X |
| 4,729,253 | 3/1988 | Rosheim | 901/29 X |

FOREIGN PATENT DOCUMENTS 1059235 3/1954 France ................ 464/125

Primary Examiner—Allan D. Herrmann
Attorney, Agent, or Firm—Hill, Van Santen, Steadman & Simpson

[57] ABSTRACT

This invention comprises a general redundant spherical linkage capable of producing singularity free relative motion of two arms which intersect at a fixed point. All points of all links of the invention move on spheres that are concentric about this fixed point of intersection of the two arms. In a general way the invention can be considered as a sphere which is divided by a central link that supports two pairs of orthogonally intersecting axes of rotation for four semicircular links that are 180° arcs of great circles. The point of intersection of a pair of orthogonally pivoted semicircular links, directs an arm passing through the center of the sphere. Each pair of orthogonally pivoted links controls the spherical motion of one arm within one hemisphere. By simultaneously controlling all four pivoted links, arbitrary relative motion of the two arms can be achieved.

20 Claims, 11 Drawing Sheets

DEXTROUS SPHERICAL ROBOT WRIST

BACKGROUND OF THE INVENTION

1. Field of the Invention

The present invention relates generally to the field of robotics and more particularly to a robot wrist having semicircular links to produce relative motion of a pair of radial arms.

2. Description of the Related Art

There are presently two types of robot wrists. The first type of robot wrists are those that are actuated ball and socket (spherical) joints as are shown in the following references.

The Humen U.S Pat. No. 3,973,469 shows a power transmission mechanism which utilizes a spherical member. The machine could be back-driven through fluid pressure to actuate a spherical joint.

The Wells U.S. Pat. No. 4,045,958 presents a hydraulically actuated multi-directional positioner which could be used as a robot wrist.

The Rosheim U.S. Pat. Nos. 4,194,437 and 4,296,681 describe hydraulic servo mechanisms which impart an arbitrary rotary movement.

The Dien U.S. Pat. No. 4,628,765 describes the use of two slotted spherical yokes in order to control the direction of a control pin which extends from the ball of a spherical joint. The control pin may serve as the roll axis of the end-effector of a robot.

All these types of robot wrists are capable of singularity free motions within the workspace of their end-effector. Their workspace is less than a hemisphere due to interference between the roll axis attached to the ball and the socket of the spherical joint.

The second type of robot wrists are those that imitate an actuated ball and socket joint with multiple actuated revolute (turning) joints as is shown in the following references.

The Ikeda U.S. Pat. No. 4,683,406 presents a joint assembly which is similar in motion to the human forehand.

The Taylor U.S. Pat. No. 4,073,201 describes a powered wrist joint containing three intersecting revolute joints. The mechanism is C-shaped permitting movement of the roll shaft about the yaw axis through an arc in excess of 180°.

Many wrists of the second type also incorporate gear systems to accommodate drives external to the wrist. The Rosheim U.S. Pat. No. 4,686,866 presents a nonspherical robot wrist joint having a mechanical joint for simultaneous pitch, yaw and roll movement. Within its workspace the wrist joint is singularity free.

The Kimura U.S. Pat. No. 4,574,655 incorporates three intersecting revolute joints and a system of bevel gears and shafts to accommodate drives remote of the wrist.

The Stackhouse U.S. Pat. No. 4,068,536 also describes a remotely-driven wrist mechanism containing three intersecting revolute joints. Drive is provided by three concentric shafts.

The Fletcher U.S. Pat. No. 4,068,763 presents a geared three axis robot wrist with the feature of fine positioning ability.

With the exception of Rosheim U.S. Pat. No. 4,686,866, this type of wrist encounters singularities in the wrist motion (unavoidable mechanically degenerate configurations), or interference problems between links. The Rosheim U.S. Pat. No. 4,686,866 has a nonspherical structure.

In robotics, a major problem is that of the wrist joint singularity. In order to overcome this problem, it becomes necessary to introduce redundant bodies and joints into the wrist joint. With redundancy introduced, a new problem of interference between links is encountered.

SUMMARY OF THE INVENTION

The present invention is a redundant wrist joint which is free of both interference and singularity problems in a maximized workspace. To accomplish this advantage, the invention provides an essentially "doubled" wrist, i.e. the wrist is comprised of a pair of two degree-of-freedom pointing systems which are attached together by a common supporting link. The inventive wrist joint in general has four degrees-of-freedom, requiring four actuators. By enforcing two constraint relations between the four degrees-of-freedom, through hardware, the number of actuators required can be reduced to two. Alternately, the constraint relations can be enforced through controlling software, in which case four actuators are required.

In one embodiment, the invention provides for coordinated actuation of four semicircular links to produce relative motion in a pair of radial arms. The invention also provides a passive spherical joint, such as in power and/or motion transmitting shafts or linkages.

Applications of the invention exist in robotics, both as a wrist joint, or as a shoulder joint for an industrial manipulator. In addition, applications exist in the aiming of searchlights, weaponry, antennae and radar dishes, and even for orienting solar collectors and the like.

DESCRIPTION OF THE PREFERRED EMBODIMENTS

1. Kinematic Structure

Figure 1:
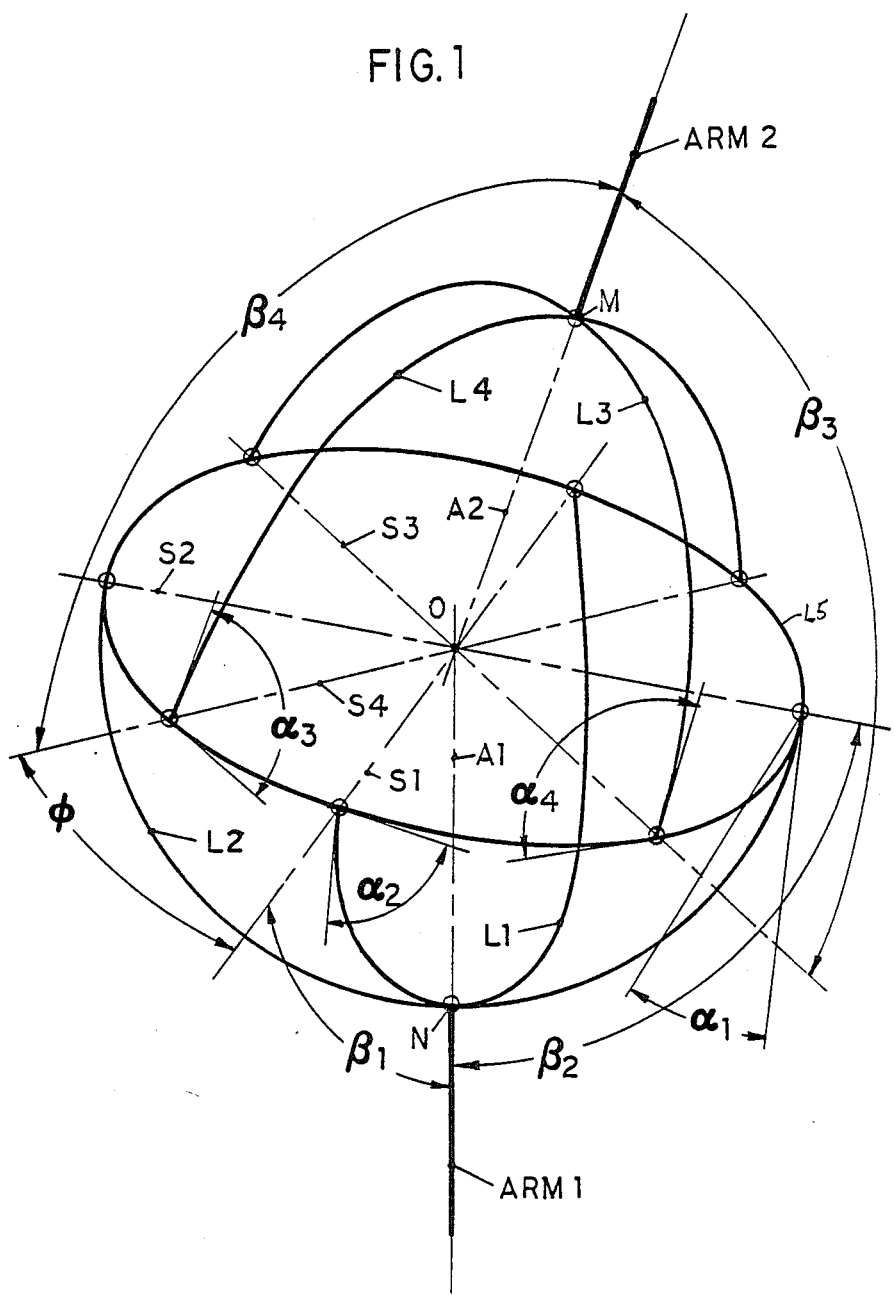
FIG. 1 is a schematic diagram of the general inventive mechanical wrist joint.

The general concept of the present invention is shown schematically in FIG. 1. A spherical linkage is provided comprised of two pairs of semicircular links, a first pair L1 and L2, and a second pair L3 and L4. The link pair L1 and L2 pivot independently on a central link L5 about orthogonal axes S1 and S2 which intersect at point O. The link pair L3 and L4 pivot independently on the central link L5 about orthogonal axes S3 and S4 which also intersect at point O. The two pair of orthogonally intersecting axes S1 and S2 and S3 and S4 may be angularly displaced an angle $\phi$ with respect to each other as shown in FIG. 1. The angle $\phi$ may have any value between 0° and 90°.

Figure 2:
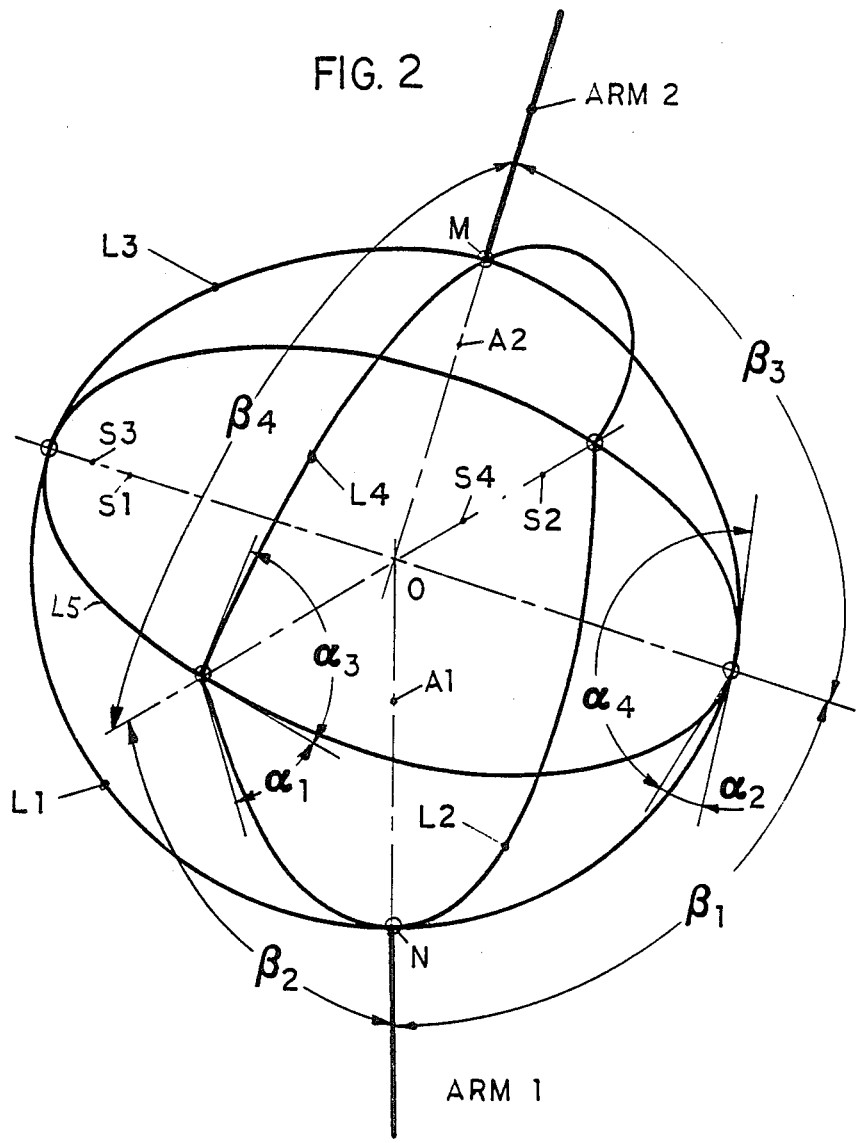
FIG. 2 is a schematic diagram of the inventive mechanical wrist where two pair of orthogonal axes are taken as coincident.

In FIG. 2 is represented by a schematic drawing the situation where $\phi=0°$, in which case the axes S1 and S3 are coincident and the orthogonal axes S2 and S4 are coincident. The links L1 and L2 intersect at a point N on a sphere centered at the point O. The links L3 and L4 intersect at a point M on a sphere also centered at the point O. An arm 1 is mechanically constrained so that it's axis A1 passes through the points O and N. An arm 2 is also mechanically constrained to so that it's axis A2 passes through the points O and M. Means of achieving this mechanical connection of the arms to the linkage system will be discussed.

The invention shown schematically in FIGS. 1 and 2 has eight possible parameters of actuation. The first four are joint angles $\alpha_1$, $\alpha_2$, $\alpha_3$ and $\alpha_4$ formed by the links L1, L2, L3 and L4 respectively with the central link L5. By coordinating the four angular motions $\alpha_1$, $\alpha_2$, $\alpha_3$, and $\alpha_4$ any prescribed motion of the arm 1 relative to the arm 2 can be achieved, with the exception of passing the arm 1 through the arm 2. The remaining four possible parameters of actuation are arclengths $\beta_1$, $\beta_2$, $\beta_3$ and $\beta_4$. By coordinating the four arclengths $\beta_1$, $\beta_2$, $\beta_3$, and $\beta_4$, any prescribed relative motion of the arm 1 and the arm 2 is possible. There also exists the possibility of a mixed actuation of joint angles $\alpha_1-\alpha_4$ and arclengths $\beta_1-\beta_4$. A variety of methods of achieving all these types of actuations will be discussed.

The arm 2 may serve as a roll axis of, for example, a gripper while the arm 1 may be rigidly connected to a forearm of an arm-subassembly.

2. Description of Particular Embodiments

In all the remaining figures, the schematic links L1 and L2 of FIGS. 1 and 2 are provided as semicircular links 10 and 20, respectively, the schematic links L3 and L4 are semicircular links 30 and 40, respectively, and the schematic central link L5 is a circular link 50 with a geometric center at the point 0. The schematic axes S1 and S3, which are shown coincident in FIG. 2, are equivalent to an axis 51, while the schematic axes S2 and S4, which are shown coincident in FIG. 2, are equivalent to an axis 52.

Figure 3:
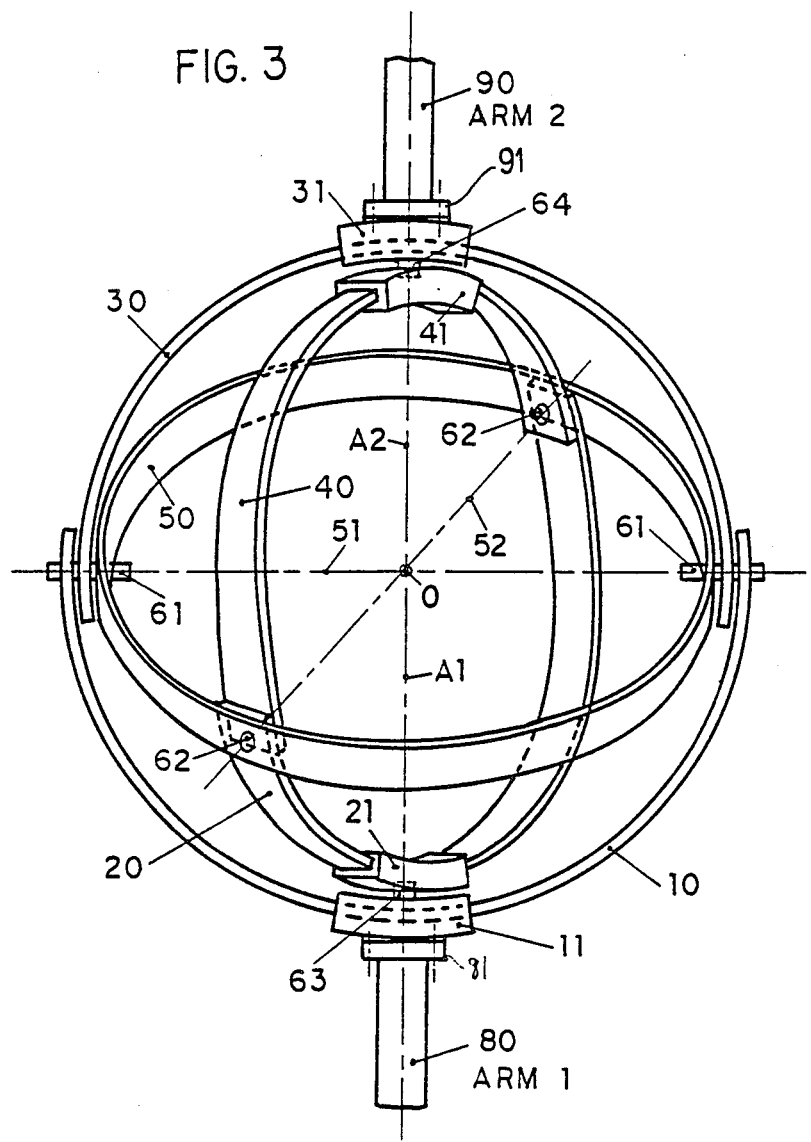
FIG. 3 is a perspective view of one version of a wrist according to the principles of the present invention.

FIG. 3 shows an embodiment of the invention with a pair of pivoting sliders used to mechanically connect each arm to the system. A lower hemisphere of the wrist contains the semicircular links 10 and 20 which pivot relative to the central link 50 about the orthogonally intersecting axes 51 and 52, respectively. This is achieved with pins 61 and 62. A block 11 slides on the link 10 and a block 21 slides on the link 20. The blocks 11 and 21 are allowed to pivot relative to one another by means of a pin 63. An arm 80 is mounted to a flange 81 which is an extension of block 11, so that an axis A1 of the arm 1 passes through the point O, which is the geometric center of the central link 50. By rotating the links 10 and 20 about the pins 61 and 62, the arm 80 can be pointed anywhere within the lower hemisphere.

The upper hemisphere of the illustrated wrist contains the semicircular links 30 and 40 which pivot relative to the central link 50 about orthogonally intersecting axes 53 and 54. This is achieved with the pins 61 and 62. A block 31 slides on the link 30 and a block 41 slides on the link 40. The blocks 31 and 41 are allowed to pivot relative to one another by a pin 64. An arm 90 is mounted to a flange 91 which is an extension of the block 31, so that an axis A2 of the arm 2 passes through the point O, which is the geometric center of the central link 50. By rotating the links 30 and 40 about the pins 61 and 62, the arm 90 can be pointed anywhere within the upper hemisphere.

Figure 4:
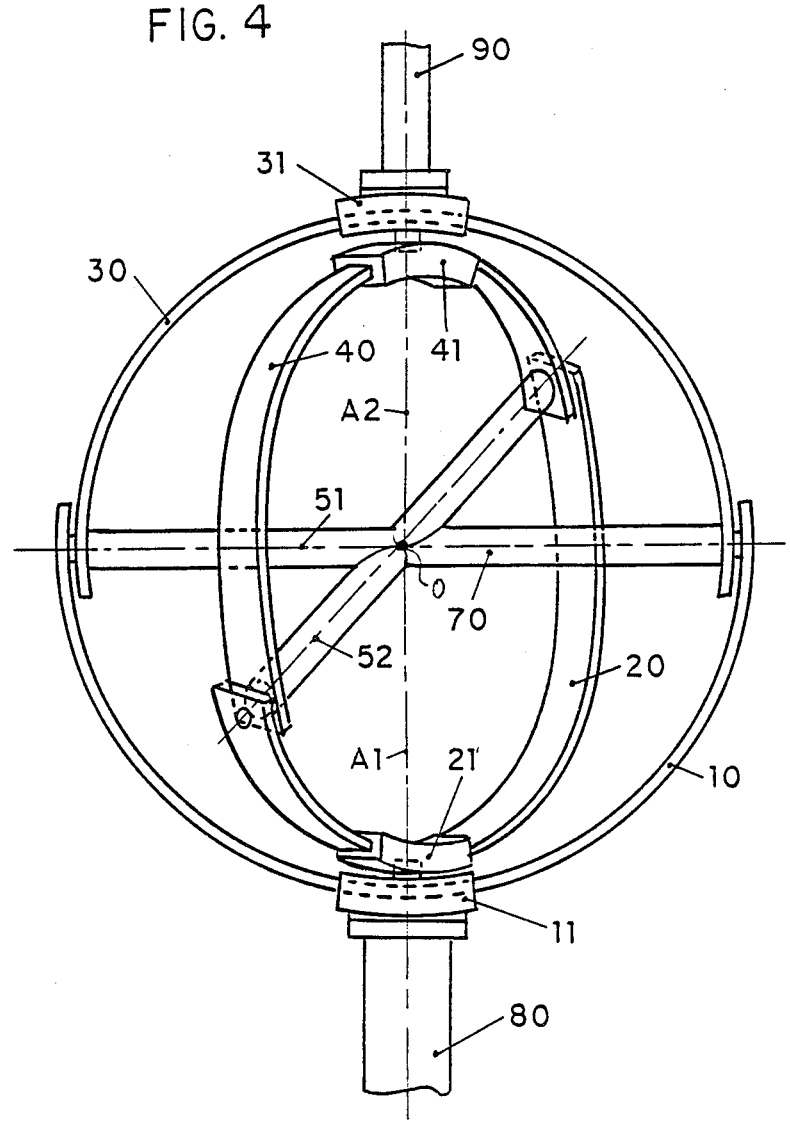
FIG. 4 is a perspective view of another version of the present wrist.

An alternate configuration of the present wrist has the central link 50 of FIG. 3 replaced by a cross-shaped member 70 as shown in FIG. 4. The cross-shaped member 70 has first and second arms lying on axes 51 and 52, respectively, that are shown connected at the point O. The pivot axis 51 for the lower link 10 is shown coincident to the axis 51 for the upper link 30. The same is true for the coincident axis 52 of the links 20 and 40. It is contemplated that the angle $\phi$ may be introduced between the pivot axis of the link 10 and the link 30, as well as between the orthogonal pivot axis for the links 20 and 40 in the embodiments of FIGS. 3 and 4. Thus, such variations embody the kinematic concepts shown in FIG. 1. FIGS. 3 and 4 are shown with angle $\phi=0°$.

Figure 5:
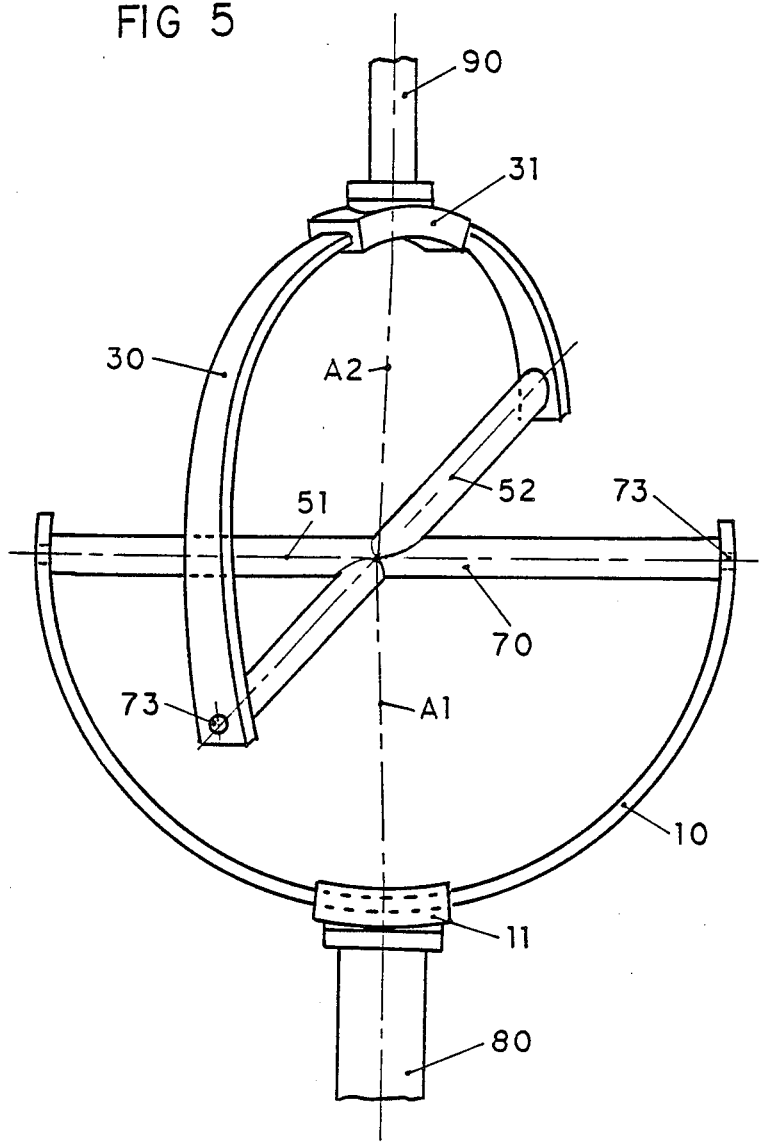
FIG. 5 is a perspective view of yet another version of the wrist.
Figure 6:
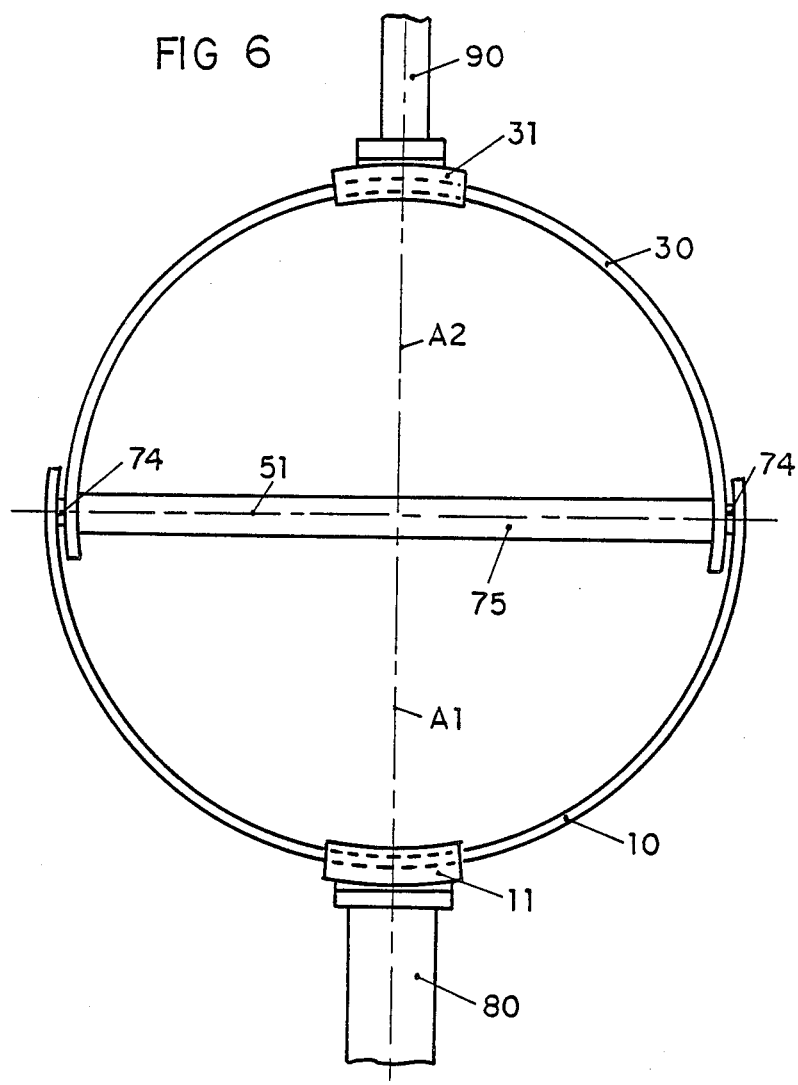
FIG. 6 is a perspective view of a further version of the instant wrist.

FIG. 5 and FIG. 6 each show a variation where one link from each pair of orthogonally pivoted links has been eliminated. In FIG. 6, the sliders 11 and 31 contact the links 10 and 30, respectively. The links 10 and 30 are articulated with a respect to a central link 75 at pins 74. This variation requires a mixed actuation of both the joint angles $\alpha_1$ and $\alpha_3$, and the arclengths $\beta_2$ and $\beta_4$. The mechanism of FIG. 5 is a variation of the mechanism of FIG. 6 which shows the angle $\phi=90°$. This requires that original central link 75 of FIG. 6 be replaced with a crossed central link 70 of FIG. 5. This variation also requires the mixed actuation of both the joint angles and the arclengths.

3. Methods of Actuation

Referring to FIG. 1 and/or FIG. 2, as previously mentioned, there are eight potential sources of actuation, these are the four joint angles $\alpha_1$, $\alpha_2$, $\alpha_3$ and $\alpha_4$, and the four arclengths $\beta_1$, $\beta_2$, $\beta_3$, and $\beta_4$. The invention provides in particular embodiments, a redundant pointing system in which four actuations of the eight possible actuations are required to produce a constrained relative motion of the arms 80 and 90. In general, however, only two actuations are required to achieve this type of relative pointing motion of the arms.

In that the system has two redundant actuations, two constraining relations are required between any of the four chosen actuations. These two constraining relations can be enforced through the controlling software, in which case four actuator motors will be required. Alternately, the constraining relations can be enforced through hardware, e.g. with a system of gears and/or cables between actuations. In this way only two actuating motors will be required. A first constraint is one that requires, referring to FIG. 2, that the joint angles, $$\alpha_4 = \alpha_2 \tag{1}$$

and $$\alpha_3 = \alpha_1 \quad (2)$$

In this way, the motions of the links in the lower hemisphere "mirror" the motion of the links in the upper hemisphere. This constraint is enforced by including equations (1) and (2) in the controlling software. In this case, the signals sent to actuate the motors controlling $\alpha_2$ and $\alpha_4$ are identical, and the signals sent to actuate the motors controlling $\alpha_1$ and $\alpha_3$ are identical. Four actuating motors are still used; however, only two independent signals are required to control the wrist.

Figure 7:
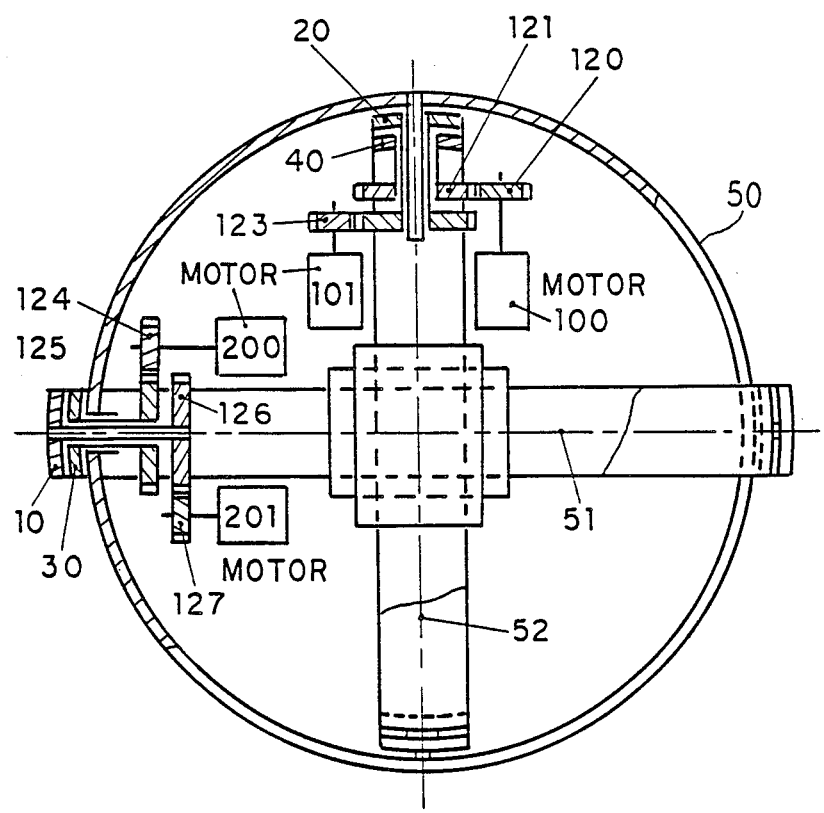
FIG. 7 is a partial cross section of an embodiment of the present wrist showing actuation of the wrist by four motors.
Figure 8:
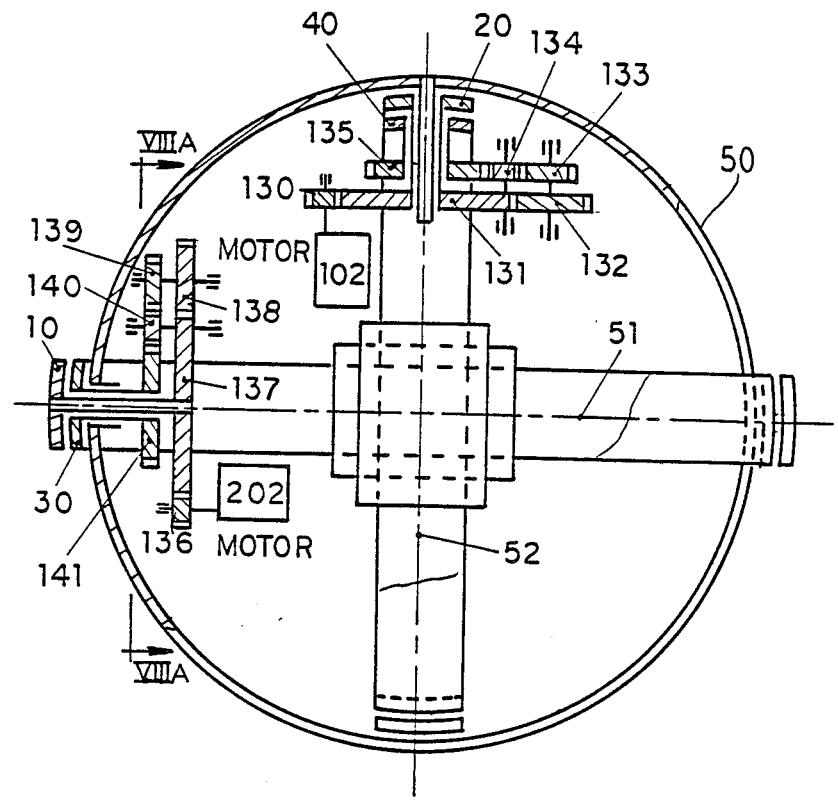
FIG. 8 is a partial cross section of an embodiment of the wrist illustrating another means of actuating the wrist by two motors.
Figure 8A:
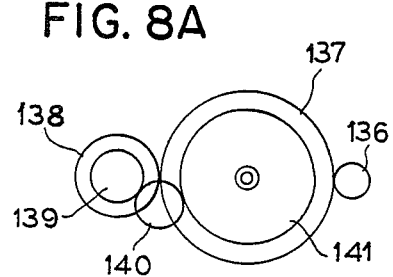
FIG. 8A is a cross section along line VIIIA—VIIIA showing the gear arrangement of FIG. 8.

The above-described situation in which four actuating motors are used is illustrated in FIG. 7. Motors 100 and 101 receive identical signals and, through gears 120, 121, 122 and 123, rotate the semicircular links 20 and 40. Motors 200 and 201 also receive identical signals and, through gears 124, 125, 126 and 127, rotate the semicircular links 10 and 30. Alternately, the "mirror" constraint can be enforced through hardware such as gearing, so as to achieve constraints (1) and (2). This requires gearing between the links 20 and 40 that pivot on the axis 52, and gearing between the links 10 and 30 that pivot on the axis 51 as shown in FIG. 8. Gears 130 through 135 provide for simultaneous actuation of the links 20 and 40 about the axis 52 by motor 102. Gears 136 through 141 provide for simultaneous actuation of the links 10 and 30 about the axis 51 by motor 202.

The mirroring concept can also be achieved by imposing constraints on the arclengths, as follows:

$$\beta_3 = \beta_1 \quad (3)$$

and $$\beta_4 = \beta_2 \quad (4)$$

Figure 9:
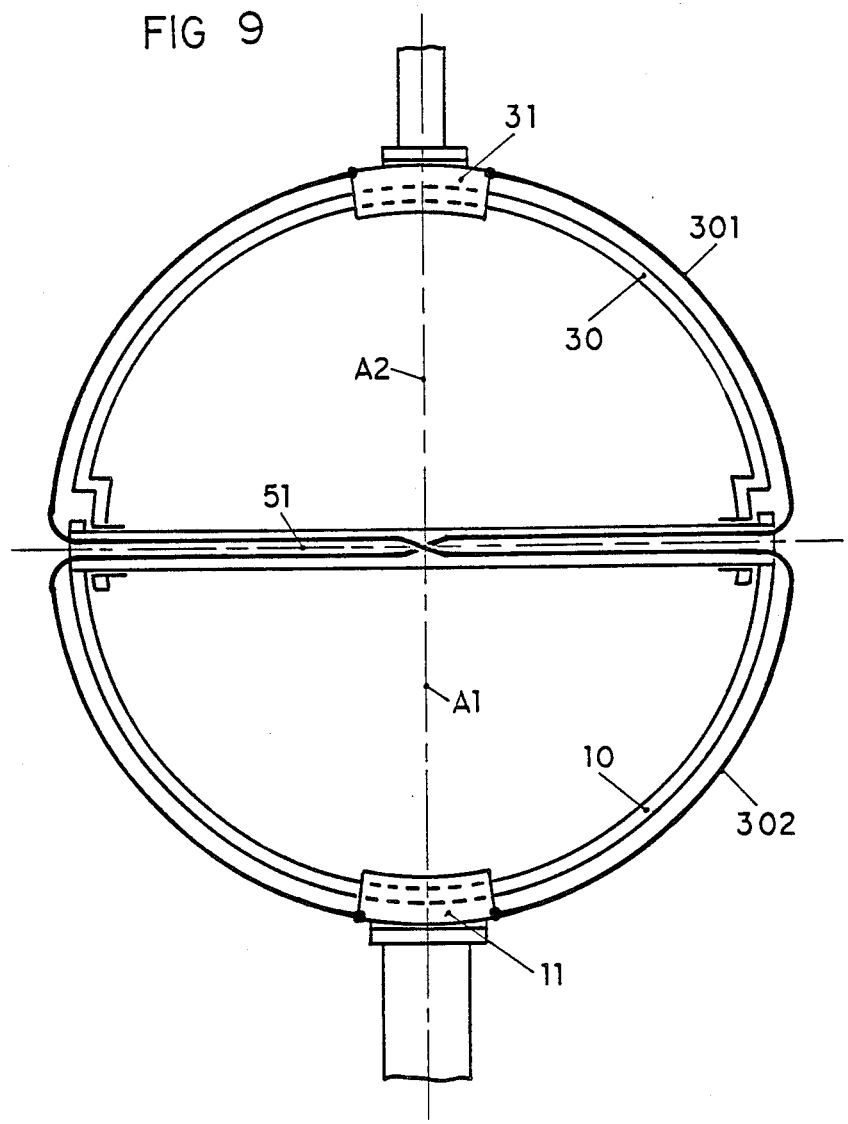
FIG. 9 is a schematic view illustrating a means of coupling the actuation of two sliding blocks in a wrist of the present invention.

Similar to the previous case where actuation was through the joint angles, now only two of the arclength actuations are independent. FIG. 9 illustrates a system of two cables 302 and 301 connected between sliding blocks 11 and 31 in order to mechanically achieve the constraint equation (4). An interesting possibility has cables 301 and 302 actuated external to the wrist by linear or rotary actuators. In this case, a pulley system may be incorporated into the cable system in order to increase the mechanical advantage of the actuation. A similar system of two cables is used to simultaneously actuate $\beta_1$ and $\beta_3$ according to the constraint equation (3), and $\beta_2$ and $\beta_4$ according to constraint equation (4).

Figure 10:
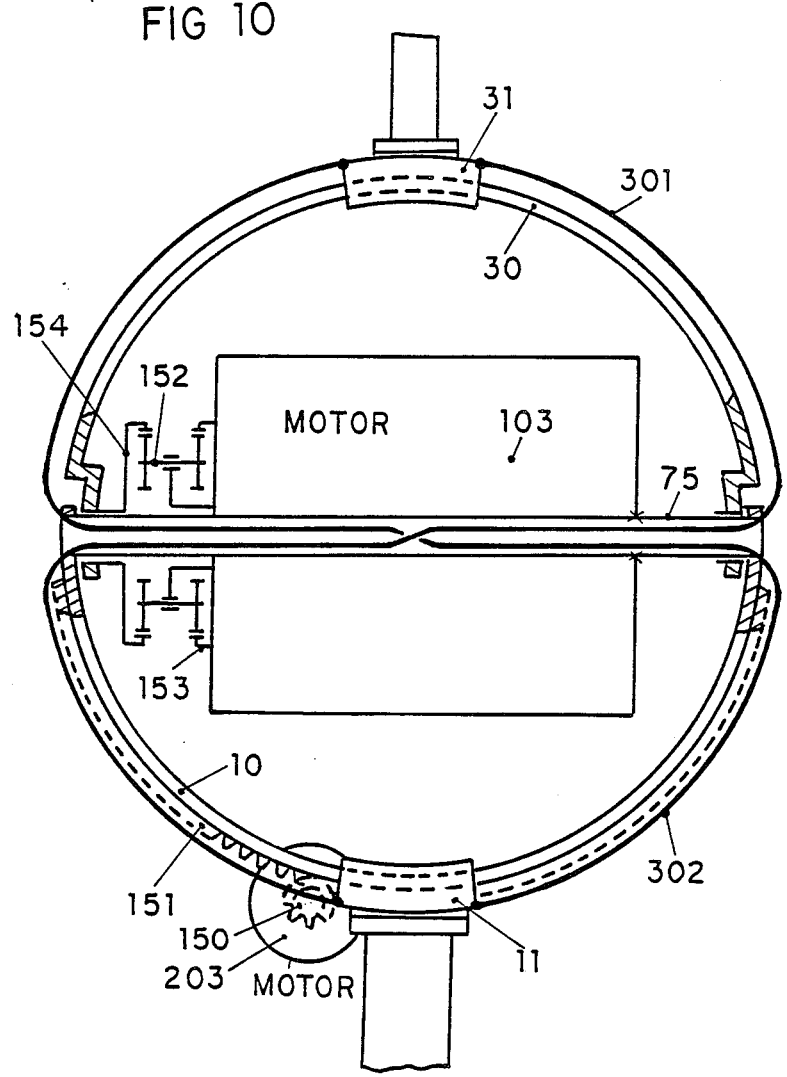
FIG. 10 is a schematic diagram showing a means of actuating both joint angles and arclengths using only two motors in the present wrist.

It is also possible to have a combined actuation of joint angles and arclengths, as previously mentioned. To mechanically constrain the system, any combination of two constraint equations (1)-(4) is enforced with a combination of both gearing between axes of rotation, and the cable system between sliding blocks. An example of this combined case is shown in FIG. 10 where a motor 103 rigidly connected to the central link 75 simultaneously actuates both joint angles $\alpha_2$ and $\alpha_4$ through a planetary gear train comprised of gears 152, 153, and 154. In place of the shown planetary system, a harmonic drive and simple gearing between joint angles $\alpha_2$ and $\alpha_4$ may be used. FIG. 10 also shows a motor 203 and pinion 150 which actuate arclength $\beta_2$ through gear 151 which is attached to the semicircular link 10, and a system of two cables 301 and 302 that actuate the arclength $\beta_4$. The embodiment has many desirable inertia properties which simplify the dynamic analysis and control of the entire manipulator which employs the described invention. In this embodiment, the inertia of the wrist appears to be nearly independent of the relative position of the two controlled arms, if the inertia of the system is concentrated primarily at the motor which actuates semicircular links 10 and 30 through either a planetary system or a harmonic drive with simple gearing.

Figure 11:
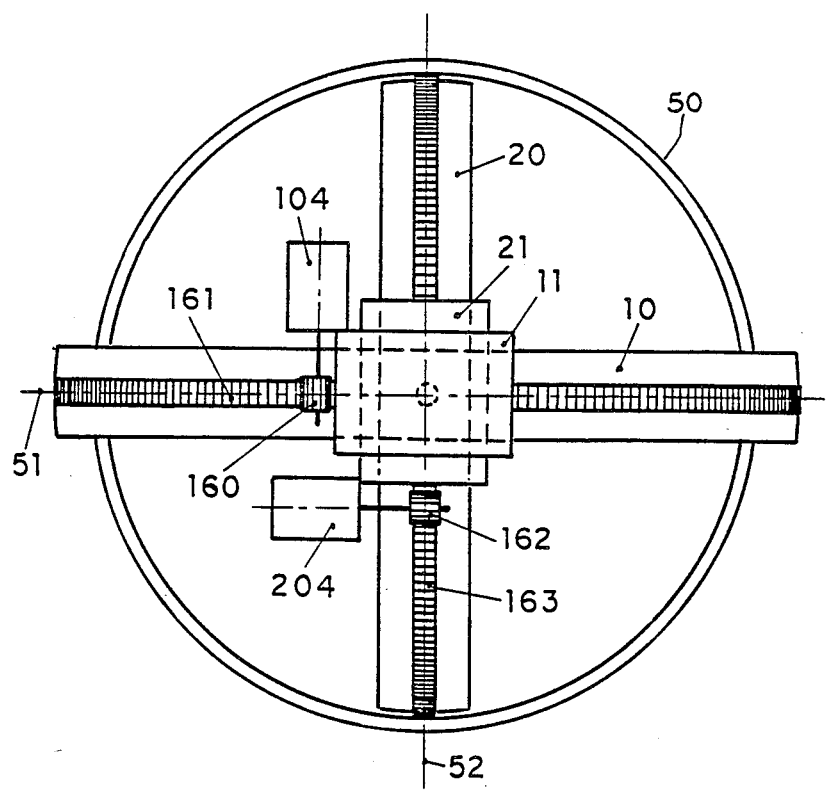
FIG. 11 is a schematic diagram showing a means of actuating arclengths in a wrist of the invention.

In FIG. 11 is illustrated a means of actuating the arclengths $\beta_1$ and $\beta_2$. A motor 104 attached to the sliding block 11 actuates the arclength $\beta_1$ through pinion 160 and gear 161 attached to the semicircular link 10. A motor 204 attached to the sliding block 21 actuates the arclength $\beta_2$ through pinion 162 and gear 163 attached to the semicircular link 20. An identical system may be used in the upper hemisphere to actuate the arclengths $\beta_3$ and $\beta_4$, or instead a system of cables as previously shown in FIG. 9 may be used.

To minimize any of the discussed actuating forces and/or torques, low friction bearing surfaces are preferably provided between all sliders and their contacted surfaces and also between all pins and links. Low friction slider surfaces can be provided by a thin layer of Delrin (a tradename) applied to either the bearing surface on the slider or the link. Alternately, a system of recirculating rolling elements can be incorporated into the design of the sliders to reduce friction at the sliding surfaces. For low friction at the pins, self-lubricating metal/plastic bearings or rolling element bearings may be used.

To reduce friction between any cables and any links upon which they are guided, a system of simple rollers may be used to guide the cables over the links.

It is not necessary that the blocks 11, 21, 31 and 41 have the specific shapes shown. All that is necessary is that these elements are guided on their respective links. Of course, the axes described in the foregoing as "intersecting" or as "coincident" need not be precisely so to be within the scope of the invention, so long as the axes are substantially or at least nearly intersecting or are substantially coincident.

The material preferred for the construction of this invention is a high strength steel if the manufacturing application is one of high precision. When compliance is necessary in the wrist joint in order to wiggle pegs into holes or in other such operations which require some flexibility or compliance, a more flexible spring steel is allowable. For lightweight wrist joints which have more favorable dynamic characteristics, composite materials may be used for the links of the invention.

A number of means of actuation and construction of our basic invention exist. While some specific embodiments of the invention have been described in detail illustrating the basic principles of the invention, it will be understood that the invention may be embodied otherwise without departing from the described basic principles.

We claim:

1. A mechanical wrist connectable between a first and second arm comprising:
    a central link providing at least a first pair of opposed pivot points lying on a first pivot means;
    a first semicircular link pivotally connected to said central link at said first pair of pivot points for pivoting movement in a first hemisphere about said first pivot axis;
    a second semicircular link pivotally connected to said central link at a second pair of pivot points lying on a second pivot axis for pivoting movement in a second hemisphere, said first pivot axis substantially intersecting said second pivot axis at a point fixed relative to the wrist;

a first block mounted for sliding movement along said first semicircular link;

means for connecting said first arm to said first block;

a second block mounted for sliding movement along said second semicircular link; and means for connecting said second arm to said second block.

2. A mechanical wrist as claimed in claim 1, wherein said second pivot axis of said second semicircular link being substantially coincident with said first pivot axis of said first semicircular link.

3. A mechanical wrist as claimed in claim 1, wherein said second pivot axis of said second semicircular link is pivotally connected to said central link offset from said first pivot axis of said first link by a first angle.

4. A mechanical wrist as claimed in claim 3, wherein said first angle is substantially equal to 90°.

5. A mechanical wrist as claimed in claim 1, further comprising:
a third semicircular link pivotally connected to said central link at a third pair of pivot points for pivoting movement in said first hemisphere, said third pair of pivot points lying on an axis substantially at 90° to an axis passing through said first pair of pivot points;

a third block mounted for sliding movement along said third semicircular link; and means for rotationally connecting said third block to said first block.

6. A mechanical wrist as claimed in claim 5, further comprising:
a fourth semicircular link pivotally connected to said central link at a fourth pair of pivot points for pivoting movement in said second hemisphere, said fourth pair of pivot points lying on an axis substantially at 90° to an axis passing through said second pair of pivot points;

a fourth block mounted for sliding movement along said fourth semicircular link; and means for rotationally connecting said fourth block to said second block.

7. A mechanical wrist as claimed in claim 6, wherein said first and second pair of pivot points are substantially coincident, and wherein said third and fourth pair of pivot points are substantially coincident.

8. A mechanical wrist as claimed in claim 6, wherein said first pair of pivot points is offset from said second pair of pivot points by a first angle, and wherein said third pair of pivot points is offset from said fourth pair of pivot points by an angle substantially equal to said first angle.

9. A mechanical wrist as claimed in claim 1, wherein said central link is an annular member.

10. A mechanical wrist as claimed in claim 1, wherein said central link is a cross-shaped member.

11. A mechanical wrist as claimed in claim 1, further comprising:
means for actuating pivoting movement of said first semicircular link in said first hemisphere about said first pair of pivot points.

12. A mechanical wrist as claimed in claim 1, further comprising:
means for actuating sliding movement of said first block along said first semicircular link.

13. A mechanical wrist as claimed in claim 2, further comprising:

means for interconnecting said first and second blocks for coordinated sliding movement along said respective first and second semicircular links.

14. A mechanical wrist as claimed in claim 13, wherein said means for interconnecting said first and second blocks is a system of cables connected between said first and second blocks.

15. A mechanical wrist as claimed in claim 6, further comprising:
four actuating motors connected to rotationally drive each of said first and second and third and fourth semicircular links.

16. A mechanical wrist as claimed in claim 6, further comprising:
first and second actuating motors connected to rotationally drive said semicircular links, said first actuating motor being connected to simultaneously drive said first and third semicircular links and said second actuating motor being connected to simultaneously drive said second and fourth semicircular links.

17. A mechanical wrist as claimed in claim 11, further comprising:
means for actuating sliding movement of said first block along said first semicircular link.

18. A mechanical wrist as claimed in claim 5, further comprising:
means for actuating sliding movement of said first block along said first semicircular link; and means for actuating sliding movement of said third block along said third semicircular link.

19. A mechanical wrist connectable between a first and second arm, comprising:
a central link providing at least a first pair of opposed pivot points lying on a first pivot means;

a first semicircular link pivotally connected to said central link of said first pair of pivot points for pivoting movement in a first hemisphere about said first pivot axis;

a second link pivotally connected to said central link at a second pair of pivot points lying on a second pivot axis for pivoting movement in a second hemisphere, said first pivot axis intersecting said second pivot axis substantially at a center within the wrist;

a first block mounted for sliding movement along said first semicircular link;

means for connecting said first arm to said first block;

a second block supported on said second link; and means for connecting said second arm to said second block.

20. A mechanical wrist connectable between a first and second arm, comprising:
a central link providing at least a first pair of opposed pivot points lying on a first pivot means;

a first semicircular link pivotally connected to said central link of said first pair of pivot points for pivoting movement in a first hemisphere about said first pivot axis;

a second link pivotally connected to said central link at a second pair of pivot points lying on a second pivot axis for pivoting movement in a second hemisphere, said first pivot axis being substantially coincident with said second pivot axis;

a first block mounted for sliding movement along said first semicircular link;

means for connecting said first arm to said first block;

a second block supported on said second link; and means for connecting said second arm to said second block.

* * * * *